United States Patent
Kluge

(10) Patent No.: US 6,285,721 B1
(45) Date of Patent: Sep. 4, 2001

(54) METHOD FOR ASSISTING SIMPLE SYNCHRONIZATION TO THE CARRIER OF A DISPERSED-ENERGY QPSK SIGNAL

(75) Inventor: Götz Kluge, München (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/498,531

(22) Filed: Feb. 4, 2000

Related U.S. Application Data

(63) Continuation of application No. PCT/DE98/02220, filed on Aug. 3, 1998.

(30) Foreign Application Priority Data

Aug. 4, 1997 (DE) ................................. 197 33 732

(51) Int. Cl.$^7$ ..................... H04L 27/22; H03D 3/00
(52) U.S. Cl. ..................... 375/332; 375/281; 375/326; 329/304; 329/307
(58) Field of Search ............... 375/279, 280, 375/281, 283, 329, 330, 331, 332, 324, 325, 326, 327; 329/304, 305, 306, 307, 308, 309, 310

(56) References Cited

U.S. PATENT DOCUMENTS

| | | | |
|---|---|---|---|
| 4,238,739 | * 12/1980 | Mosley et al. | 331/12 |
| 4,466,108 | * 8/1984 | Rhodes | 375/329 |
| 4,470,018 | 9/1984 | Steinlin . | |
| 4,509,017 | * 4/1985 | Andren et al. | 329/308 |
| 4,570,125 | 2/1986 | Gibson . | |
| 4,599,732 | * 7/1986 | LeFever | 375/346 |
| 4,687,999 | 8/1987 | Desperben et al. . | |
| 4,958,360 | 9/1990 | Sari . | |
| 5,402,449 | * 3/1995 | Schultes et al. | 375/340 |

FOREIGN PATENT DOCUMENTS 195 30 063 A1 2/1997 (DE) .

OTHER PUBLICATIONS

"Pulse Code Modulation Techniques" (Waggener), Communication Technology, ISBN 0–442–01436–8, pp. 284–311.
Rudolf Mäusl: "Digitale Modulationsverfahren", Heidelberg, 1991, ISBN 3–7785–2058–X, pp. 193–207, digital modulation methods.

* cited by examiner

Primary Examiner—Young T. Tse
(74) Attorney, Agent, or Firm—Herbert L. Lerner; Laurence A. Greenberg; Werner H. Stemer

(57) ABSTRACT

A method for simple synchronization of a receiving device to a transmitting device for a transmission of a dispersed-energy QPSK signal. The signal is composed at the transmitting end of two mixed products, the mixed product of an I signal and a transmitted carrier and the mixed product of a Q signal and the transmitted carrier shifted through 90°. In order to synchronize the received carrier to the transmitted carrier without any problems, it is proposed that an amplitude of an SQ signal be measured at the time of the zero crossing of the rising flank of an SI signal, and that an amplitude of the SI signal be measured at the time of the zero crossing of the falling flank of the SQ signal. The measured values are a measure of a discrepancy from synchronicity between the received carrier and the transmitted carrier, and that the frequency of the received carrier be varied until the amplitude of an error signal obtained from this measurement is zero. The measurement is carried out with the smallest possible number of measured values.

10 Claims, 3 Drawing Sheets

METHOD FOR ASSISTING SIMPLE SYNCHRONIZATION TO THE CARRIER OF A DISPERSED-ENERGY QPSK SIGNAL

CROSS-REFERENCE TO RELATED APPLICATION

This is a continuation of copending International Application PCT/DE98/02220, filed Aug. 3, 1998, which designated the United States.

BACKGROUND OF THE INVENTION

FIELD OF THE INVENTION

The present invention relates to a method for synchronizing a received carrier to a transmitted carrier for a dispersed-energy QPSK signal.

The invention relates in general to the field of digital modulation methods, such as the digital video broadcast via satellite (DVB-S) method. In particular, the present invention relates to carrier recovery on reception of a transmitted digital signal, in particular of a dispersed-energy quadrature phase shift keying (QPSK) signal. A QPSK signal is the mixed product of two orthogonal signals I and Q (referred to as the I signal and the Q signal, respectively, in the following text), which are phase-shifted through 90° with respect to one another. The I and Q signals are also completely independent of one another at the receiving end, provided the received carrier and the transmitted carrier are at the same frequency, and their phases are coupled.

At the receiving end, the QPSK signal is mixed in one path with a TI carrier signal in order to obtain the I signal, and is mixed in a further path with a TQ carrier signal in order to obtain the Q signal, which is phase-shifted through 90° with respect to the carrier signal TI. The frequency of the carrier signal at the reception end must correspond precisely to the frequency of the carrier signal at the transmitter end, in order to ensure synchronous demodulation of the dispersed-energy QPSK signal. Non-matching carrier frequencies lead to rotation of the constellation containing the I signal and the Q signal. This rotation is brought to rest by suitable control of the received carrier, or, in modern methods, is compensated for by computational methods (for example the CORDIC algorithm). In this case, the method according to the invention can be used directly in analog QPSK demodulators by use of a comparatively simple circuit, with the minimum theoretically possible number of measured values or, using numerical QPSK processors, can determine the control value for the rotation compensation.

A known procedure for carrier recovery in the context of digital modulation methods is known, for example, from the reference titled "Digitale Modulationsverfahren" [Digital Modulation Methods], Rudolf Mäusl, 1985/1991, ISBN 3-7785-2085-X. In chapter 3.4.2, the author describes the so-called COSTAS loop, under "carrier recovery". Based on the circuit shown in FIG. 3.12, the COSTAS loop for carrier recovery with two-phase keying contains the addition of a second multiplier. In the variant of the so-called "hard" COSTAS loop, the demodulation product of the in-phase and quadrature demodulator is supplied, after low-pass filtering, to one input of the two multipliers, and the demodulation product limited to the mathematical sign by a comparator is supplied, crossed over, to the other input. The difference between the two multiplication output signals is used to provide a correction voltage for controlling the voltage-controlled oscillator. The known circuit is balanced, that is to say it is based not only on SI-controlled detection of the complete SQ signal, but also on SQ-controlled detection of the complete SI signal.

The following reference should also be cited from the prior art: "Pulse Code Modulation Techniques", Bill Waggener, 1995, ISBN 0-442-01436-8. The chapter titled "Symbol Synchronization", pages 291 to 306, describes various complicated concepts for pulse code modulation, which are likewise balanced in the sense described above, and are based on a measurement of the overall signals.

SUMMARY OF THE INVENTION

It is accordingly an object of the invention to provide a method for assisting simple synchronization to the carrier of a dispersed-energy QPSK signal that overcomes the above-mentioned disadvantages of the prior art methods of this general type, which can be carried out without major complexity, including from the component point of view and to providing an apparatus for carrying out the method, which can be produced without any major component complexity.

With the foregoing and other objects in view there is provided, in accordance with the invention, a method for synchronization of a received carrier to a transmitted carrier of a dispersed-energy quadrature phase shift keying (QPSK) signal transmitted as a mixed product containing an I signal and a Q-signal phase-shifted through 90° with respect to the I signal with the transmitted carrier, at a receiving end an SI signal being demodulated by mixing with a TI carrier signal and an SQ signal being demodulated by mixing with a TQ carrier signal that is phase-shifted through 90° with respect to the TI carrier signal, which includes:

measuring a first mean value of an amplitude of the SQ signal at a time of a zero crossing of a rising edge of the SI signal;

measuring a second mean value of an amplitude of the SI signal at a time of a zero crossing of a falling edge of the SQ signal, the first mean value and second mean value reflecting a discrepancy from synchronicity between the received carrier and the transmitted carrier; and varying a frequency of the received carrier until the amplitude of the SQ signal is zero.

The invention is based on the following knowledge: in the event of a frequency shift or frequency offset between the carrier signal at the transmitter end and the carrier signal at the reception end, the orthogonal I and Q signals of the QPSK signal rotate. That is to say the I signal and the Q signal have components in the SI and SQ signals at the reception end. A component of the SI signal, phase-shifted through 90°, is thus superimposed on the pseudo-random signal (which is based on dispersed energy) in the SQ signal and this component has its inversion point, that is to say its positive or negative maximum, at the time of the zero crossing of the rising flank of the SI signal. The magnitude of this value increases as the frequency offset increases. The same is true for the SI signal. Accordingly, a component of the SQ signal, shifted through 90°, is superimposed on the pseudo-random signal in the SI signal, the SQ mean value of which component is not equal to zero at the time of the zero crossing of the rising flank of the SI signal, and which is formed as a positive or negative maximum of the mean value (in comparison with mean values formed at other times). The magnitude of the mean value formed from these values increases as the relative frequency offset increases. The relative frequency offset DF is the absolute frequency offset divided by the symbol rate. The magnitude of the mean value is calculated from the error function erf(DF).

The invention makes use of this knowledge in that the mean value of the SQ signal at the time of the zero crossing of the rising flank of the SI signal, and the amplitude of the SI signal at the time of the zero crossing of the falling flank of the SQ signal, are measured or detected as a measure of the discrepancy of the synchronicity between the received carrier and the transmitted carrier, with the frequency of the received carrier being varied until this amplitude is zero, by which the received carrier is synchronized to the transmitted carrier of the dispersed-energy QPSK signal.

On the other hand, the method according to the invention requires only the theoretical minimum number of measured values of a component of the signal pair, whose detection is controlled by the other component of the signal pair. The solution proposal according to the invention does not require detection of SI, which is required at the same time and is controlled by SQ, or detection of SQ, controlled by SI, with a symmetrical synchronizer configuration, since it is sufficient just to detect SQ controlled by SI (or SI controlled by SQ). The more complex balanced configuration is prior art both for digital and analog methods.

For demonstration, the method according to the invention for matching the transmitter to the receiver can be carried out without any problems by using an oscilloscope to which the received signal is applied, and from whose screen the zero error in the amplitude of the SQ signal and of the SI signal is determined, and is reduced to zero by controlling the received carrier frequency, in order to produce synchronicity.

In a practically implemented demodulation circuit, it is also possible to supply the discrepancy between the SI signal and the SQ signal from the value zero to a clock recovery device in a QPSK decoder for determining a start value for a downstream carrier recovery device, in order to allow the clock recovery device to be adjusted very quickly.

The apparatus according to the invention for carrying out the method according to the invention has, in a manner known per se, a QPSK demodulator which, on the input side and based on an oscillator, produces a TI carrier signal and a TQ carrier signal which is phase-shifted through 90° with respect to the TI carrier signal. The signals are mixed via mixing stages with the received QPSK signal, in order to obtain an SI signal and an SQ signal, which are orthogonal to one another.

The special feature of the apparatus according to the invention is a synchronization device which has a trigger circuit to which the SI signal is applied, a sample and hold circuit to which the SQ signal and the output signal from the trigger circuit are applied, and an averaging circuit to which the output signal from the sample and hold circuit is applied and whose output signal can be fed as an actuating signal to the oscillator via a low-pass filter (for averaging), and which is, for example, a voltage-controlled oscillator. In digital systems, the synchronization device containing the trigger, sample and hold circuits and low-pass filter may also follow a derotator (CORDIC), may then determine the error in the uncorrected state and may then, via the error function erf(DF) supply considerably improved parameters for the derotator. The rotation of the QPSK constellation is thus very quickly brought to rest, controlled by the error, while search methods with rotation frequency changes using constant step widths are in this case still prior art.

Other features which are considered as characteristic for the invention are set forth in the appended claims.

Although the invention is illustrated and described herein as embodied in a method for assisting simple synchronization to the carrier of a dispersed-energy QPSK signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
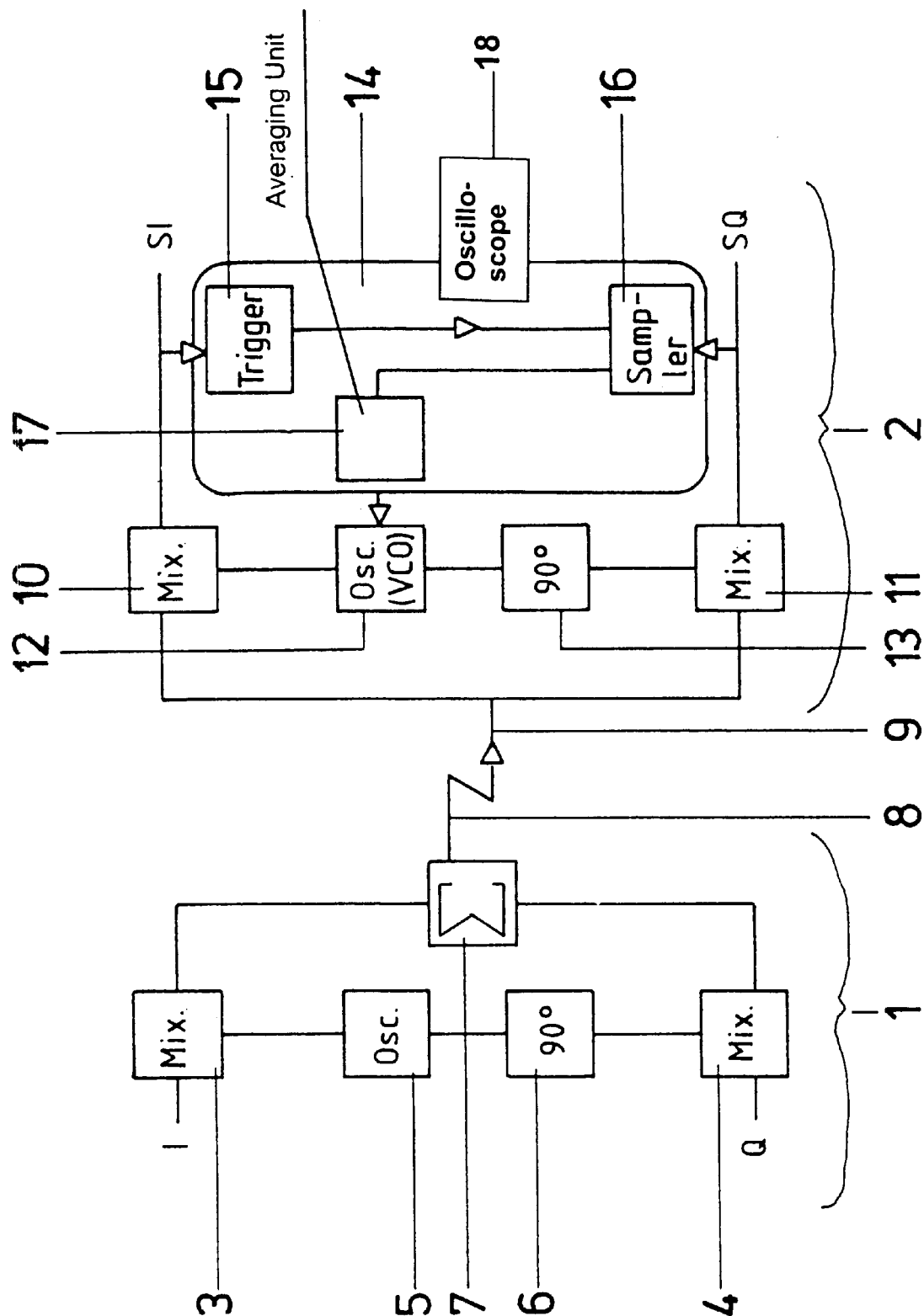
FIG. 1 is a block diagram of a transmitting/receiving system for a dispersed-energy QPSK signal according to the invention.

In all the figures of the drawing, sub-features and integral parts that correspond to one another bear the same reference symbol in each case. Referring now to the figures of the drawing in detail and first, particularly, to FIG. 1 thereof, there is shown a transmitting/receiving system containing a transmitter, which is generally denoted by the reference number 1, and a receiver 2, which is generally denoted by the reference number 2. The illustrations respectively show, schematically, an output stage of the transmitter 1, and an input stage of the receiver 2 (i.e. a QPSK demodulator).

The transmitting/receiving system shown in FIG. 1 is used to transmit dispersed-energy quadrature phase shift keying (QPSK) signals via a carrier. In order to produce the QPSK signals and a carrier signal, the transmitter 1 has a first mixing stage 3, to which an I signal is applied, a second mixing stage 4, to which a Q signal is applied, an oscillator 5 for producing a carrier signal and which is directly linked to the first mixing stage 3 in order to modulate the carrier with the I signal, and a phase-shifting stage 6 via which the oscillator 5 is connected to the second mixing stage 4, in order to modulate the carrier with the Q signal. The outputs of the first mixing stage 3 and of the second mixing stage 4 are connected to one another via an addition stage 7, at whose output the QPSK signal to be transmitted is present. The addition stage 7 is connected on the output side to an antenna 8, which emits the QPSK signal to the receiver 2, and which has a receiving antenna 9. The first mean value of the amplitude of the SQ signal and the second mean value of the amplitude of the SI signal are determined visually from a display apparatus receiving the SQ signal and the SI signal. In FIG. 1, the display apparatus is shown as an oscilloscope 18.

The input stage of the receiver 2 is of similar configuration to the output stage of the transmitter 1 and, accordingly, has a third mixing stage 10, a fourth mixing stage 11 and an oscillator 12. The oscillator 12 is directly connected to the third mixing stage 10 and is connected to the fourth mixing stage 11 with the interposition of a phase-shifter stage 13 and produces a carrier signal for demodulation of the QPSK signal into an SI signal and an SQ signal. The carrier signal is applied as the TI carrier signal to the third mixing stage 10, and as the TQ carrier signal to the fourth mixing stage 11. The third and fourth mixing stages 10 and 11 are also connected to the receiving antenna 9.

According to the invention, the receiver 2 has a synchronization unit 14, which has a trigger circuit 15, a sample and hold circuit 16 and an averaging circuit 17. An input of the trigger circuit 15 is connected to an output of the mixing stage 10 that carries the SI signal. An input of the sample and hold circuit is connected to an output of the mixing stage 11 that carries the SQ signal. A control input of the sample and hold circuit 16 is connected to an output of the trigger 15, and an output of the sample and hold circuit 16 is connected to an input of the averaging circuit 17, whose output is connected to the control input of the oscillator 12, which is in the form of a VCO, or voltage-controlled oscillator.

Figure 2:
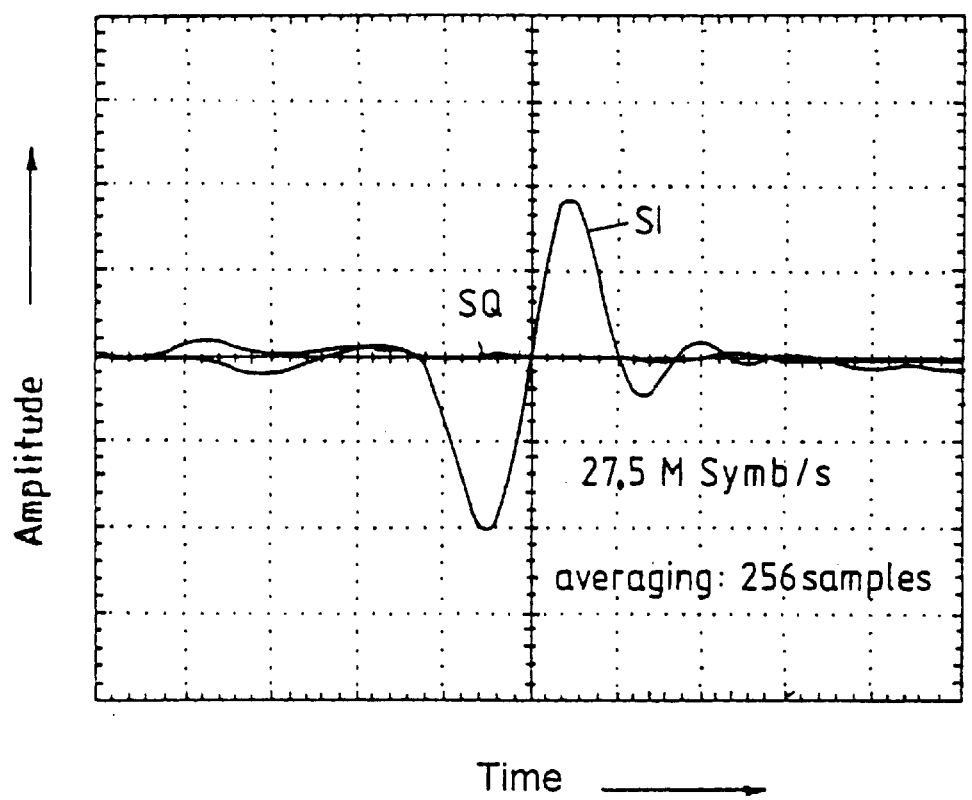
FIGS. 2–4 are graphs of a time profile of the mean values of the SI and SQ signal amplitudes for synchronicity (FIG. 2) and, respectively, asynchronicity (FIGS. 3 and 4) of transmitted and received carriers for the dispersed-energy QPSK signal.

The method of operation of the transmitting/receiving system shown in FIG. 1 will now be explained with reference to FIGS. 2 to 4, which show amplitude/time graphs of the mean values of the SI and SQ signals, respectively.

In the situation where a frequency of the carrier signal produced at the receiving end by the oscillator 12 matches that of the carrier signal produced by the oscillator 5 at the transmitter end (the two carrier signals are in synchronism with one another), demodulation of the QPSK signal into SI and SQ signals at the receiving end is ensured. This situation is shown in FIG. 2, in which the SQ signal has an amplitude value zero at the time of the zero crossing of a rising flank of the SI signal. In this situation, there is no need to readjust the frequency of the oscillator 12.

Figure 3:
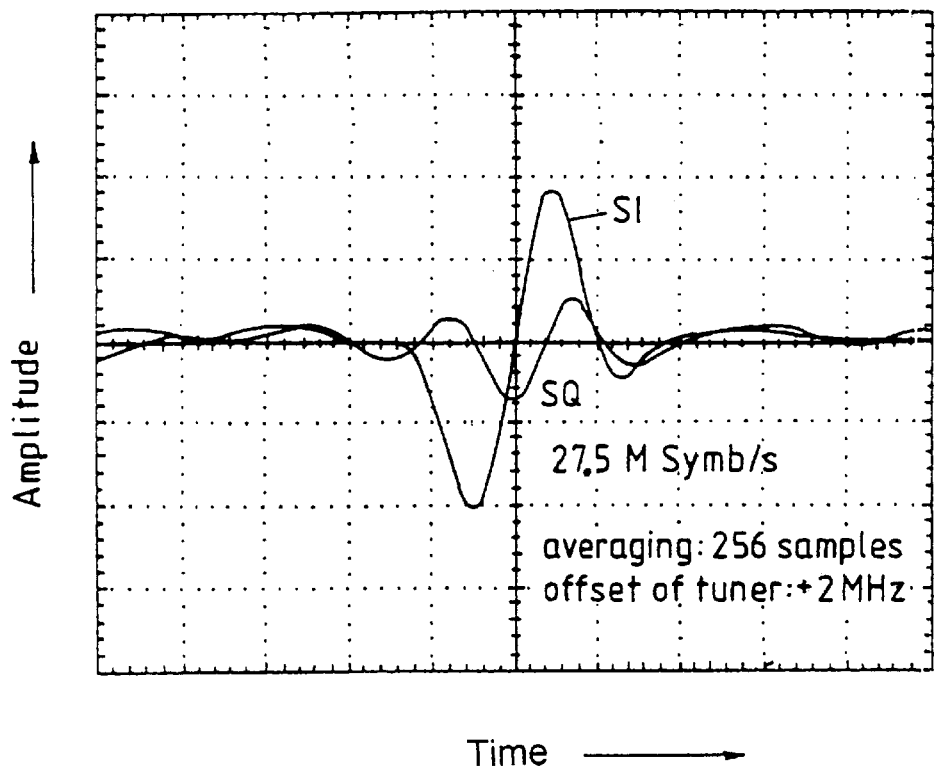
Figure 4:
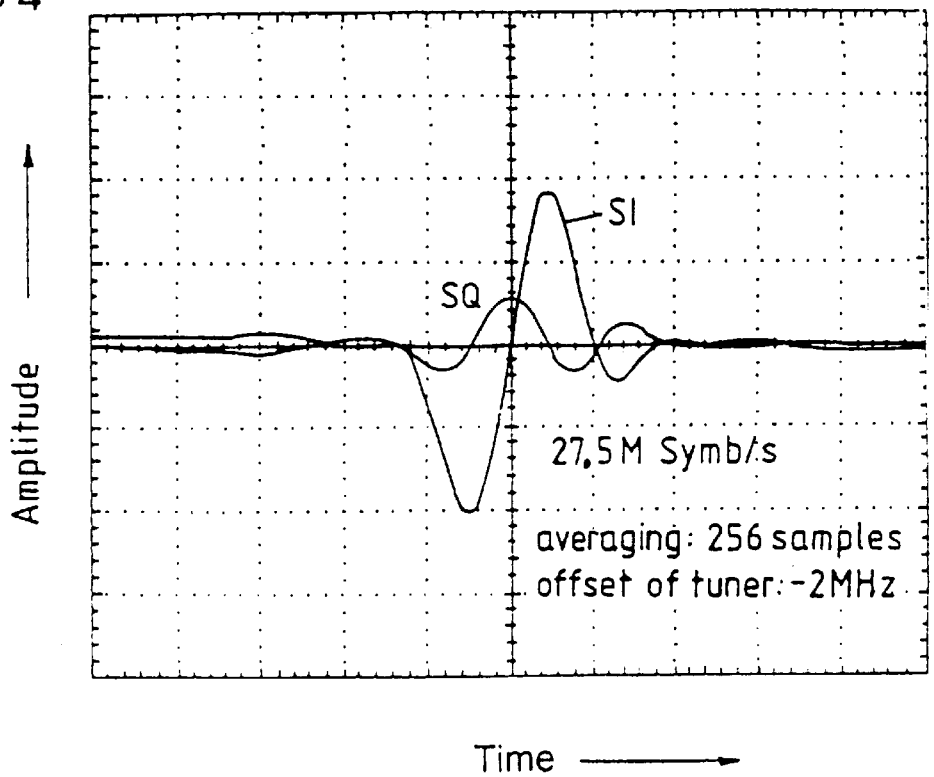

FIGS. 3 and 4 show the situation in which the carrier frequencies at the transmitter and receiving ends are not synchronous; that is to say, the SI and SQ signals contain components of the I and Q signals, respectively, owing to the I and Q signals being rotated, which leads to the SQ signal having an amplitude which is not equal to zero at the time of the zero crossing of the rising flank of the SI signal, namely, in the case of FIG. 3, a negative amplitude corresponding to a carrier tuning error of +2 MHz, and, in the case of FIG. 4, a positive amplitude corresponding to a carrier tuning error of −2 MHz. These amplitudes, which are a measure of the frequency shift between the carrier signals at the receiving and transmitter ends, are converted to a mean value by the synchronization device 14, which mean value is used to readjust the oscillator 12 until the positive or negative amplitude of the Q signal at the time of the zero crossing of the rising flank of the SI signal disappears or becomes zero, as is shown in FIG. 2.

I claim:

1. A method for synchronization of a received carrier to a transmitted carrier of a dispersed-energy quadrature phase shift keying (QPSK) signal transmitted as a mixed product containing an I signal and a Q-signal phase-shifted through 90° with respect to the I signal with the transmitted carrier, at a receiving end an SI signal being demodulated by mixing with a TI carrier signal and an SQ signal being demodulated by mixing with a TQ carrier signal that is phase-shifted through 90° with respect to the TI carrier signal, which comprises:
   measuring a first mean value of an amplitude of the SQ signal at a time of a zero crossing of a rising edge of the SI signal;
   measuring a second mean value of an amplitude of the SI signal at a time of a zero crossing of a falling edge of the SQ signal, the first mean value and second mean value reflecting a discrepancy from synchronicity between the received carrier and the transmitted carrier; and
   varying a frequency of the received carrier until the amplitude of the SQ signal is zero.

2. The method according to claim 1, which comprises determining the first mean value of the amplitude of the SQ signal and the second mean value of the amplitude of the SI signal visually from a display apparatus receiving the SQ signal and the SI signal.

3. The method according to claim 1, which comprises supplying the first mean value of the amplitude of the SQ signal and the second mean value of the amplitude of the SI signal, as a control variable, to a clock recovery device in a QPSK demodulator for determining a start value for a downstream carrier recovery device.

4. The method according to claim 1, which comprises determining the first mean value of the amplitude of the SQ signal and the second mean value of the amplitude of the SI signal visually from a display of an oscilloscope receiving the SQ signal and the SI signal.

5. The method according to claim 1, which comprises varying a frequency of the received carrier until the amplitude of the SI signal is zero.

6. An apparatus for synchronization of a received carrier to a transmitted carrier of dispersed-energy quadrature phase shift keying (QPSK) signals, comprising:
   a QPSK demodulator, including:
      an oscillator circuit generating a TI carrier signal and a TQ carrier signal phrase-shifted through 90° with respect to the TI carrier signal;
      a first mixing stage receiving and mixing the TI carrier signal and a received QPSK signal resulting in an SI signal;
      a second mixing stage receiving and mixing the TQ carrier signal and the received QPSK signal resulting in an SQ signal; and
      a synchronization device having a trigger circuit receiving the SI signal and generating an output signal, a sample and hold circuit receiving the SQ signal and the output signal from said trigger circuit and generating an output signal, and an averaging circuit receiving the output signal from said sample and hold circuit and generating an actuating signal received by said oscillator circuit, said actuating signal being a measure of a discrepancy from synchronicity between the received carrier and the transmitted carrier.

7. The apparatus according to claim 6, wherein said oscillator circuit has a voltage-controlled oscillator.

8. The apparatus according to claim 6, wherein said QPSK demodulator has a phase rotator selected from the group consisting of analog phase rotators and digital phase rotators, said phase rotator is controlled by a mean value of the signal SQ triggered by the SI signal.

9. The apparatus according to claim 6, wherein said QPSK demodulator has a phase rotator selected from the group consisting of analog phase rotators and digital phase rotators, said phase rotator is controlled by a mean value of the signal SI triggered by the SQ signal.

10. An apparatus for synchronization of a received carrier to a transmitted carrier of dispersed-energy quadrature phase shift keying (QPSK) signals, comprising:
   a QPSK demodulator, including:
      an oscillator circuit generating a TI carrier signal and a TQ carrier signal phase-shifted through 90° with respect to the TI carrier signal;
      a first mixing stage receiving and mixing the TI carrier signal and a received QPSK signal resulting in an SI signal;

a second mixing stage receiving and mixing the TQ carrier signal and the received QPSK signal resulting in an SQ signal; and a synchronization device having a trigger circuit receiving the SQ signal and generating an output signal, a sample and hold circuit receiving the SI signal and the output signal from said trigger circuit and generating an output signal, and an averaging circuit receiving the output signal from said sample and hold circuit and generating an actuating signal received by said oscillator circuit, said actuating signal being a measure of a discrepancy from synchronicity between the received carrier and the transmitted carrier.

* * * * *